(12) United States Patent
Schanzer

(10) Patent No.: US 8,439,379 B2
(45) Date of Patent: May 14, 2013

(54) BICYCLE

(76) Inventor: Mark T. Schanzer, Hitchcock, TX (US)

(*) Notice: Subject to any disclaimer, the term of this patent is extended or adjusted under 35 U.S.C. 154(b) by 23 days.

(21) Appl. No.: 13/253,641

(22) Filed: Oct. 5, 2011

(65) Prior Publication Data

US 2012/0080864 A1    Apr. 5, 2012

Related U.S. Application Data

(60) Provisional application No. 61/401,582, filed on Oct. 5, 2010.

(51) Int. Cl.
*B62M 1/12* (2006.01)

(52) U.S. Cl.
USPC ............ 280/234; 280/233; 280/244; 280/247

(58) Field of Classification Search .................. 280/234, 280/233, 244, 247, 224, 225, 232, 242.1, 280/253, 256
See application file for complete search history.

(56) References Cited

U.S. PATENT DOCUMENTS

| | | | | |
|---|---|---|---|---|
| 3,701,543 A | * | 10/1972 | Clark et al. | 280/234 |
| 4,147,370 A | | 4/1979 | Lindsey, Jr. | |
| 4,189,166 A | * | 2/1980 | Lindsey | 280/234 |
| 4,548,420 A | * | 10/1985 | Patroni, Jr. | 280/224 |
| 5,282,640 A | * | 2/1994 | Lindsey | 280/234 |
| 5,511,810 A | * | 4/1996 | Tong | 280/233 |
| 6,105,985 A | * | 8/2000 | Cosgrave | 280/248 |

* cited by examiner

*Primary Examiner* — Kevin Hurley
*Assistant Examiner* — Michael Stabley
(74) *Attorney, Agent, or Firm* — Bushman & Associates, P.C.

(57) ABSTRACT

A bicycle wherein the front wheel can be both steered and powered by reciprocal movement of the handle bars in a forward and rear direction. The drive system for the front wheel comprises a first linkage comprising two arms, one of which is a pivoting arm, and a second linkage comprising three arms, two of which are pivoting arms. The two arm linkage system is the primary driver in the sense of rotating a drive sprocket between two over center positions. The three arm linkage system, while also driving the drive sprocket, serves the primary function of moving the two arm linkage system over the two center positions, as the handle bars are reciprocated in forward and rear directions.

5 Claims, 6 Drawing Sheets

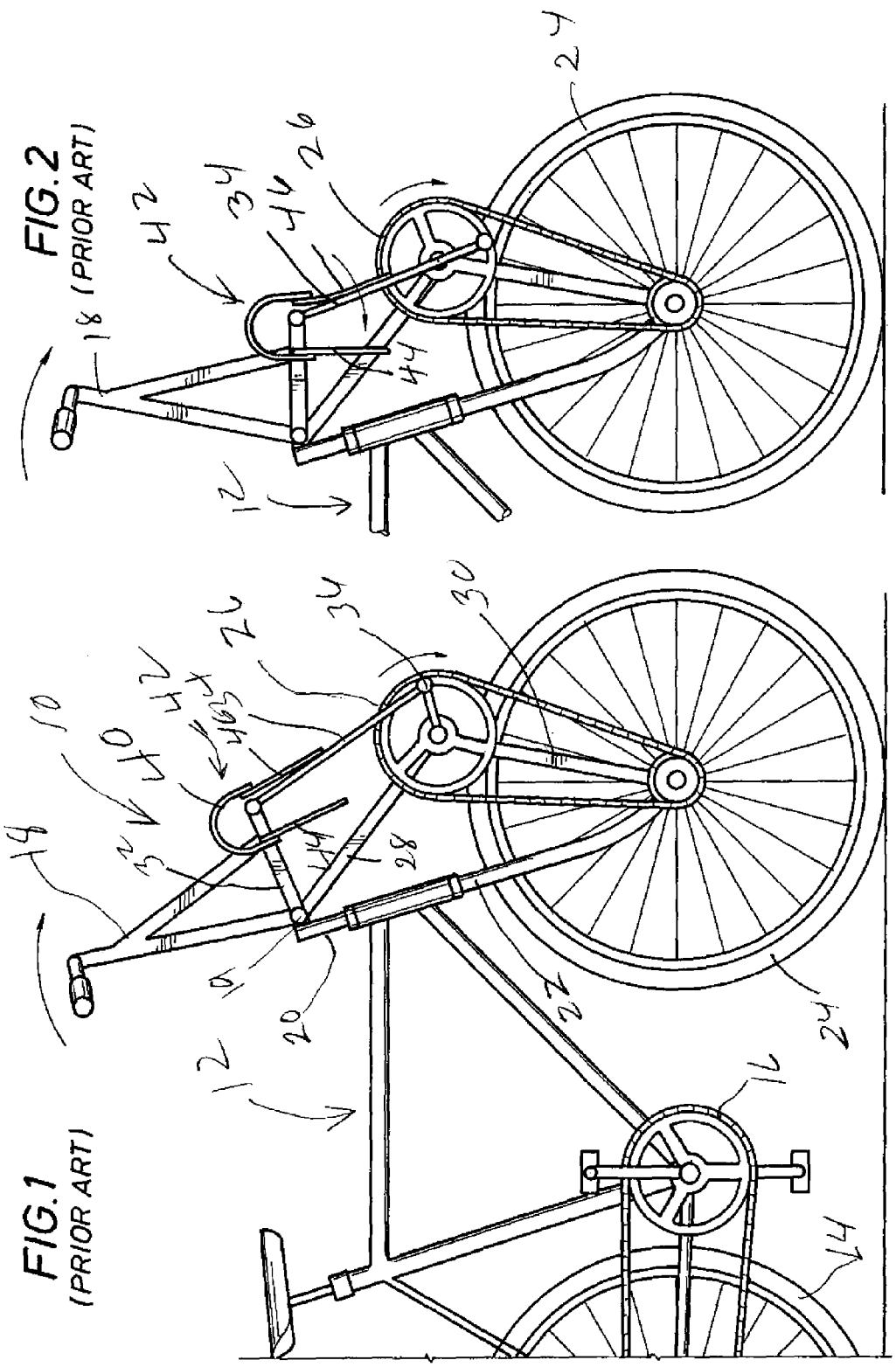

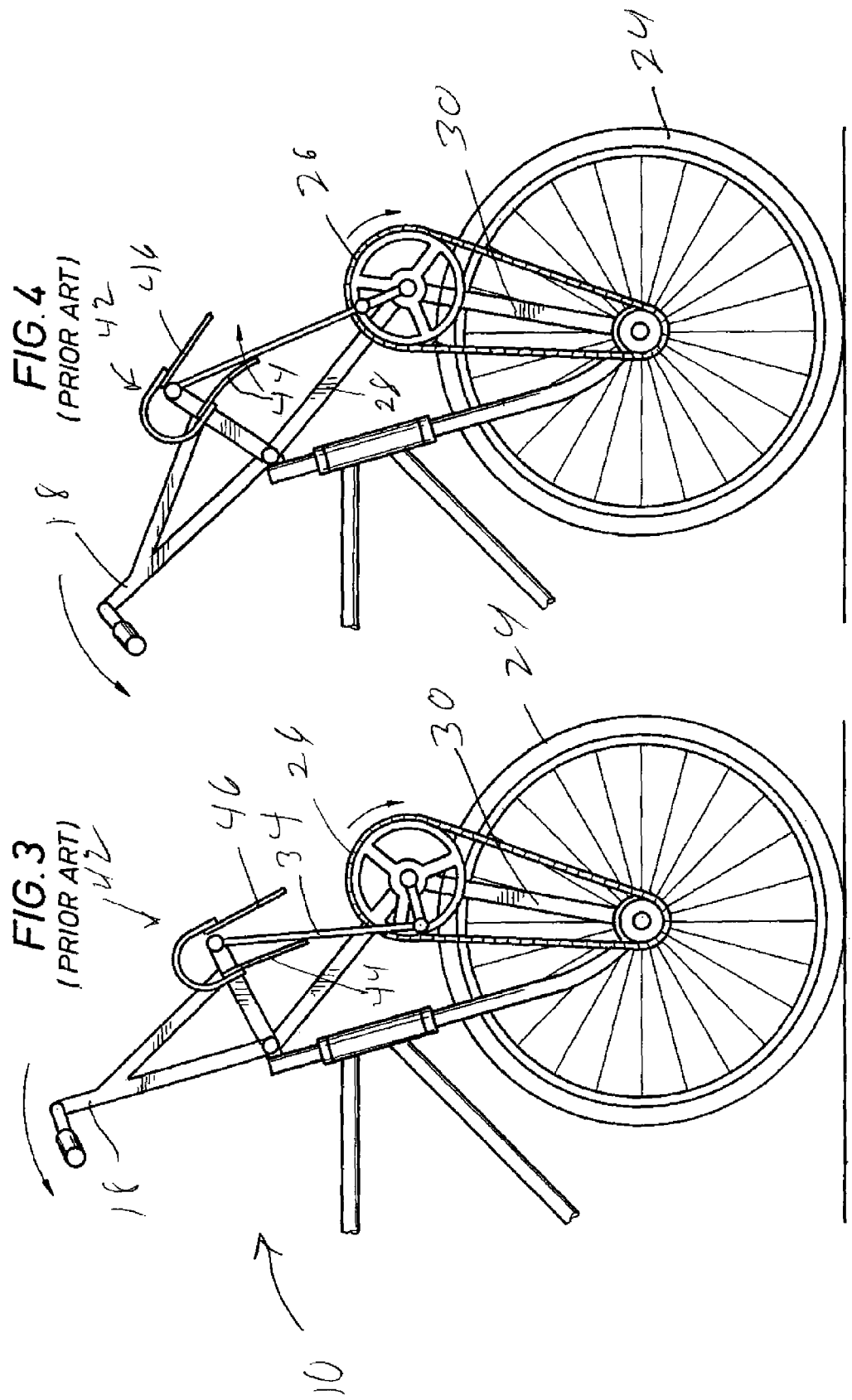

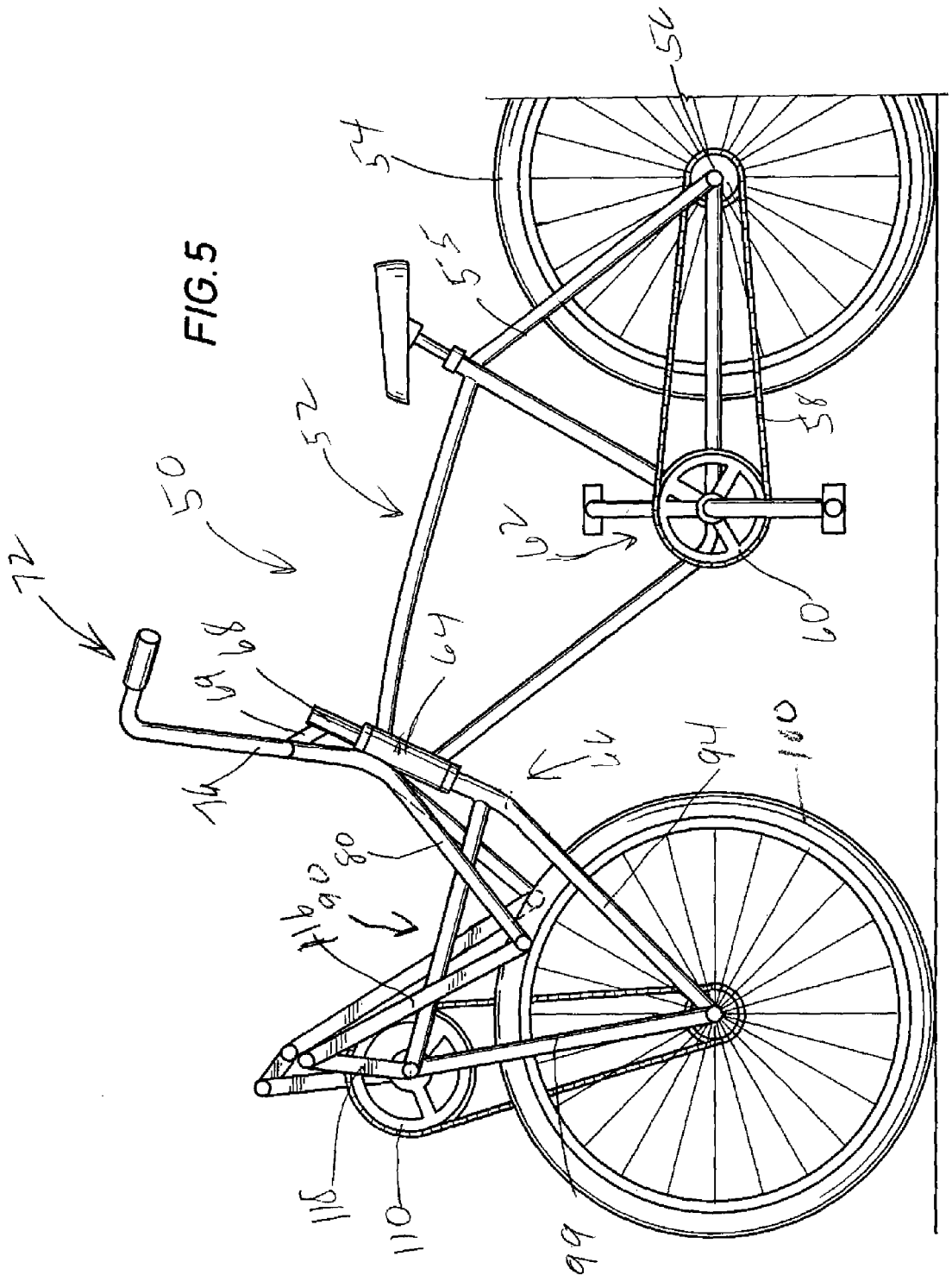

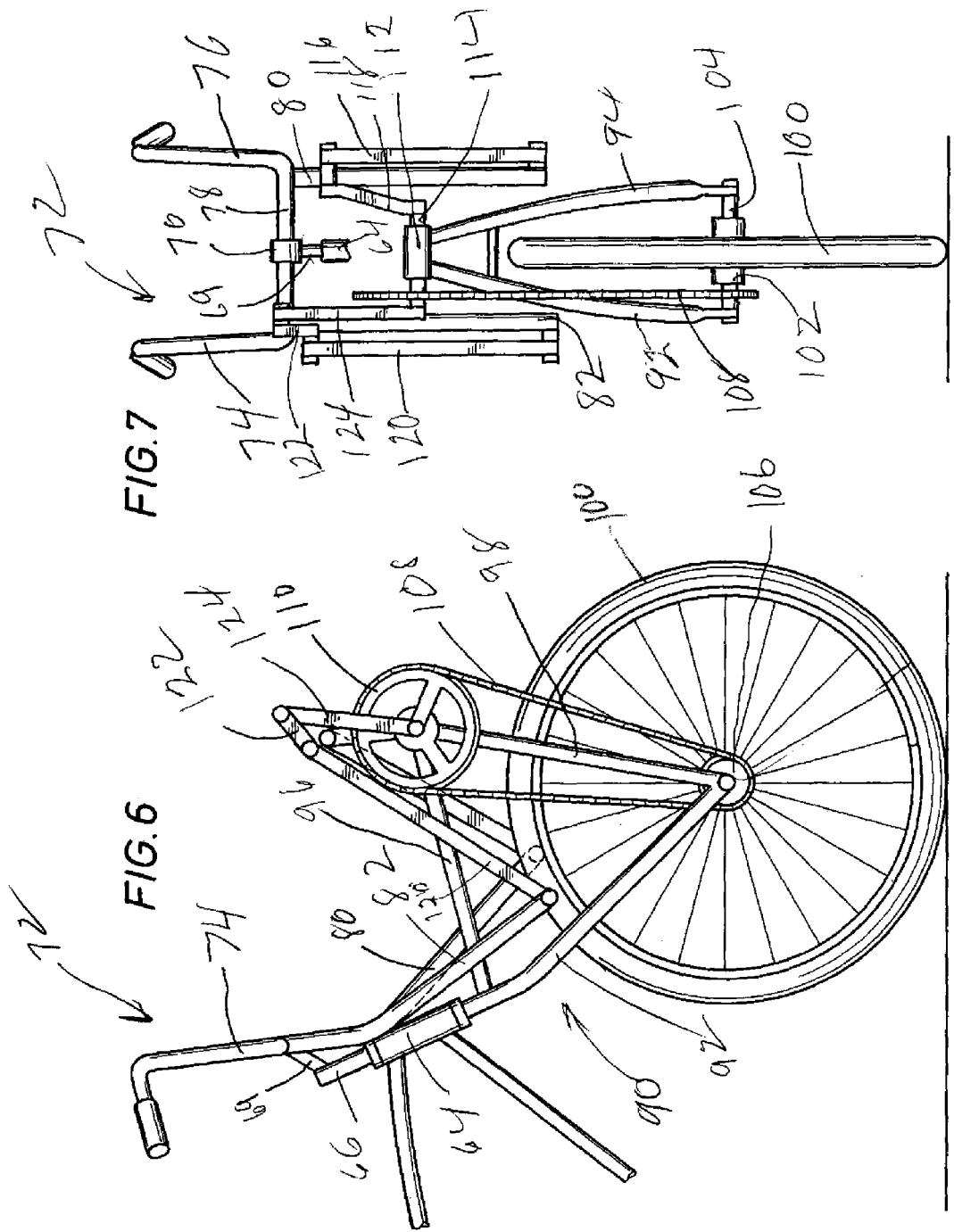

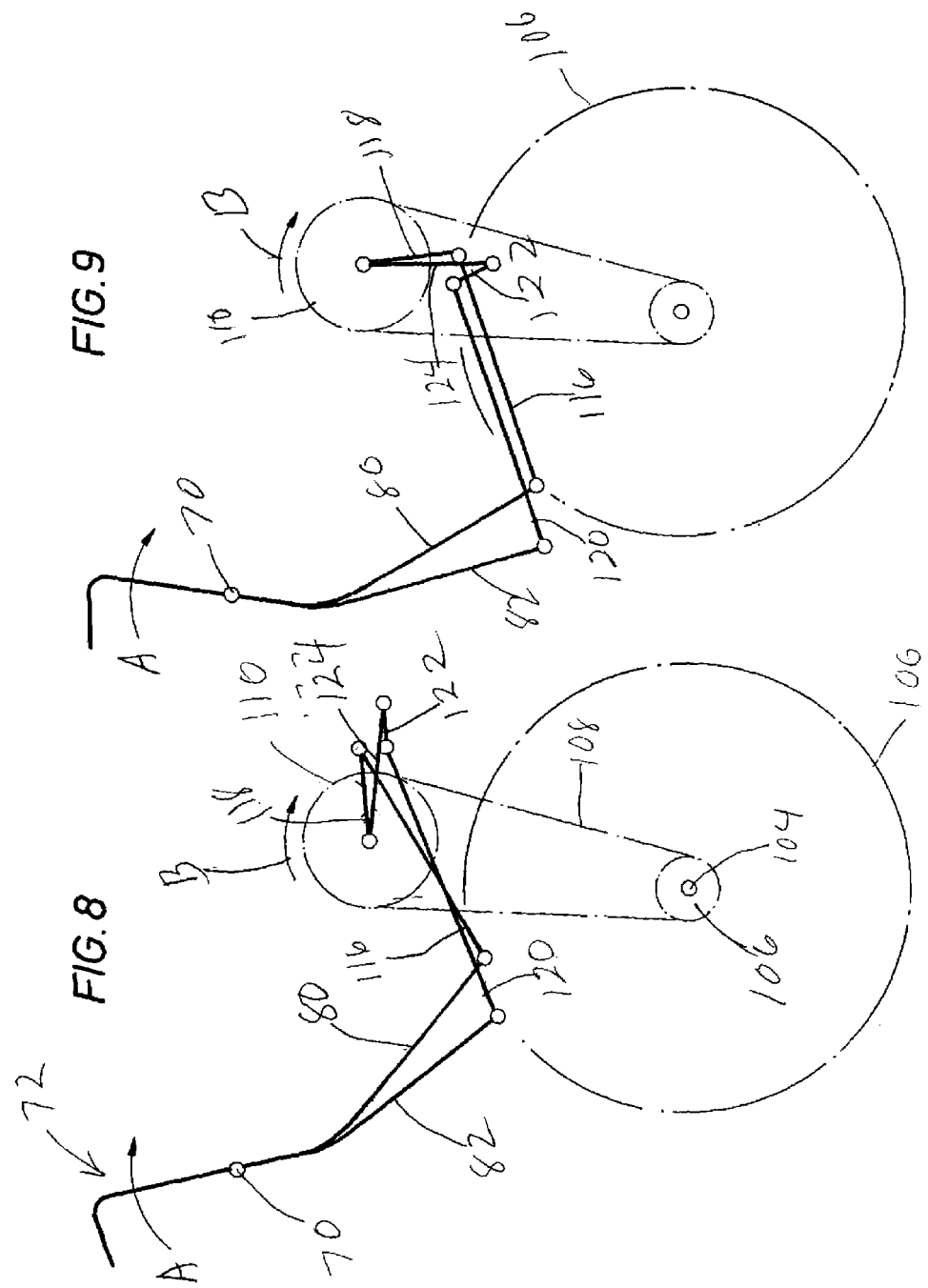

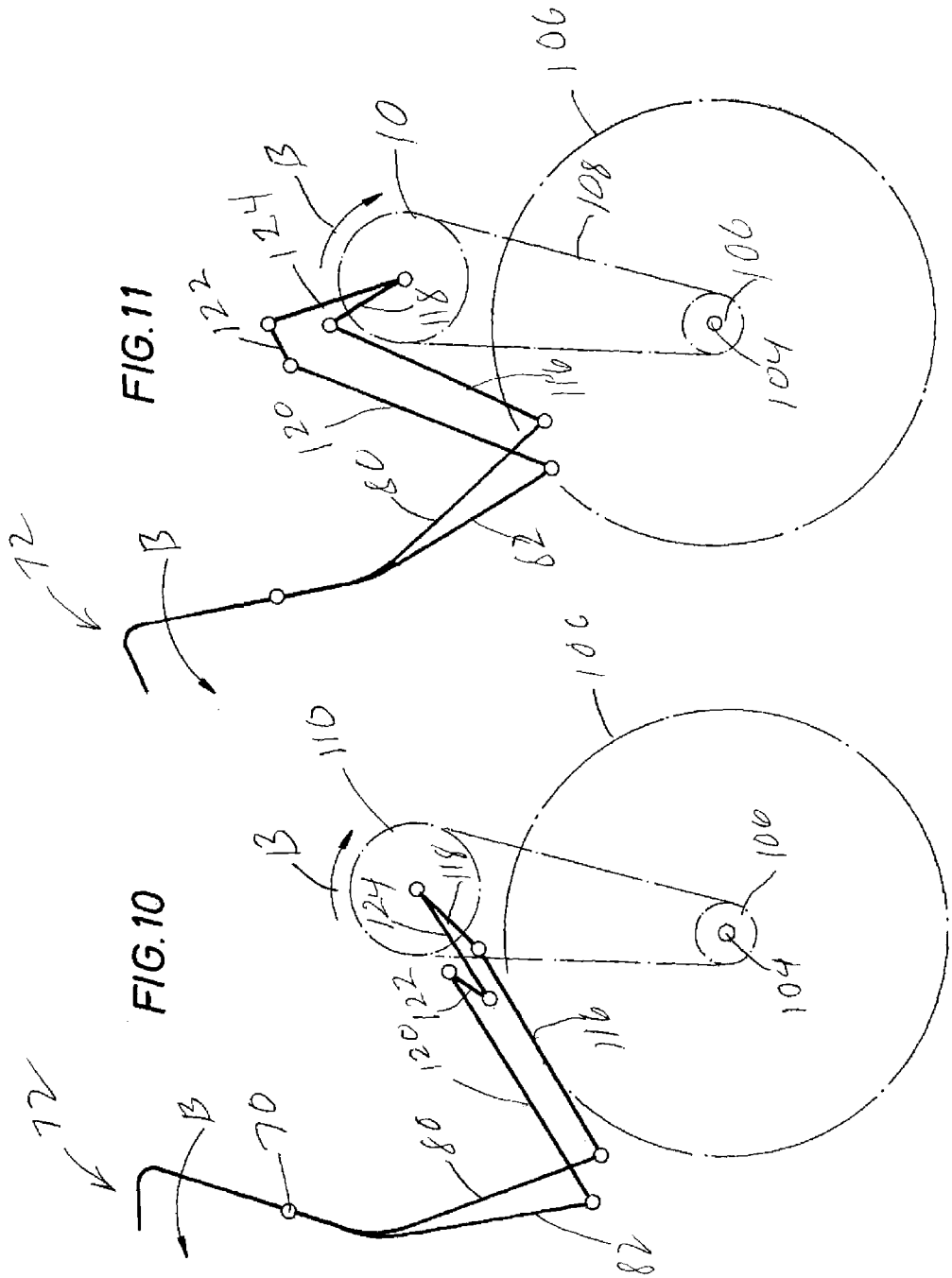

BICYCLE

CROSS REFERENCE TO RELATED APPLICATION

This application claims priority to U.S. Provisional Application No. 61/401,582 filed on Oct. 5, 2010, the disclosure of which is incorporated herein by reference for all purposes.

FIELD OF THE INVENTION

The present invention relates to a bicycle and more particularly to a bicycle having a front wheel which can be driven by arm movement of a rider.

BACKGROUND OF THE INVENTION

There are numerous bicycles or bicycle like vehicles wherein the front wheel is driven by movement of the handlebars by the arms of the rider while still allowing the front wheel to be turned for steering purposes in the conventional fashion, i.e., with a fork supporting the front wheel and being journaled in the body for rotational movement along a generally vertical axis.

However, many of these prior art bicycles wherein the front wheel can also be driven by reciprocal movement of the handle bars are complicated in the design.

SUMMARY OF THE INVENTION

In one aspect, the present invention provides a bicycle having a rear wheel powered in the conventional manner by a pedaling movement of the feet of the rider and a front wheel powered by reciprocal movement of the handle bars in a forward and back direction by the arms of the rider.

In another aspect, the present invention provides a bicycle having a front wheel driven by a simple linkage system involving only pivotal movement of link arms relative to one another.

These and further features and advantages of the present invention will become apparent from the following detailed description, wherein reference is made to the figures in the accompanying drawings.

BRIEF DESCRIPTION OF THE DRAWINGS

FIGS. 1-4 are partial, elevational views of a prior art bicycle wherein the front wheel is driven by reciprocal movement of the handle bars, the four figures showing the different positions of the mechanism used to power the front wheel.

FIG. 5 is an elevational view of one embodiment of the bicycle of the present invention.

FIG. 6 is an elevational view of the embodiment shown in FIG. 5 but showing the other side thereof.

FIG. 7 is a front, elevational view of the bicycle shown in FIGS. 5 and 6.

FIG. 8 is a schematic view showing one position of the linkage system of the present invention.

FIG. 9 is a schematic view showing another position of the linkage system of the bicycle of the present invention.

FIG. 10 is a schematic view showing another position of the linkage system of the present invention.

FIG. 11 is an elevational view showing another position of the linkage system of the present invention.

DETAILED DESCRIPTION OF PREFERRED EMBODIMENTS

Referring first to FIGS. 1-4 there is shown a prior art bicycle wherein the front wheel is driven independently of the rear wheel and by the arms of the rider. The bicycle shown generally as 10 comprises a frame shown generally as 12 of conventional design having a rear wheel 14 and a drive sprocket 16, the drive sprocket connected by an endless chain to a drive sprocket (not shown). Bicycle 10 has a handle bar 18 which is connected to the upper end 20 of a fork 22 for movement around a generally vertical axis whereby the front wheel 24 of bicycle 10 can be steered. There is a neck pivot 19 connected to the upper end 20 of fork 22 whereby handle bar 18 can be moved reciprocably in the forward and rear directions as shown by the arrows in FIGS. 1-4.

A front drive sprocket 26 is rotatably journaled in a triangle shaped frame, comprised of struts 28, 30 and fork 22. Bicycle 10 has a linkage system comprising a first arm 32 which is pivotally attached at pivot point 19 to connected to upper end 20 of fork 22 and also pivotally connected to a second arm 34, arm 34 having one end connected as at 36 to the outer rim of sprocket 26. In operation, the pivotally mounted handle bar 18 can reciprocate around neck pivot 19 between two extreme limits of forward and rear travel, thereby forcing arm 34 to rotate sprocket 26. It will thus be seen that sprocket 26 will reach an over center position respective to arm 34 at each 180° of travel. When the arm 24 is in either of these alternate over center positions, the handle bars 18 will resist being pivoted into the alternate position, since there is no force to urge arm 34 to go over center. To overcome this problem, a spring 42 is employed. Spring 42 has a first leg 44 and a second leg 46. The spring 42 is positioned such that the spaced legs 44 and 46 will alternatively contact arm 34 so as to force the drive sprocket 26 to travel over center regardless of which of the two over center positions occurs during the 360° of rotation of the sprocket 26. FIGS. 1-4 show the sequence as the handle bars 18 are moved reciprocally first forward and then rearward and the resulting contact between the legs 44, 46 of spring 42 and arm 34. In effect, FIGS. 1-4 describe the bicycle described in U.S. Pat. No. 4,147,370, incorporated herein by reference for all purposes.

Turning now to FIGS. 5-7, there is shown one embodiment of the present invention. The bicycle of the present invention, shown generally as 50, comprises a main frame shown generally as 52 and a rear wheel 54 rotatably journaled in the well known fashion in a rear fork 55 of frame 52, rear wheel 54 being connected to a driven sprocket 56 which in turn is connected by an endless chain 58 to a drive sprocket 60 which can be operated by conventional foot pedal or crank assembly shown generally as 62. Thus, in this respect, bicycle 50 is of conventional design.

Frame 52 includes a head tube 64 through which extends a front fork shown generally as 66 of bicycle 50. Received through head tube 64 is the upper end 68 of fork 66. A bearing housing 70 (FIG. 7) is connected to a neck 69 extending from the upper end 68 of fork 66 and provides a generally horizontal cylindrical bore therethrough. Bicycle 50 is provided with a handle bar shown generally as 72 which comprises first and second upright portions 74 and 76 connected by a horizontal cross bar or shaft 78, shaft 78 being rotatably journaled in bearing housing 70 whereby handle bar 72 can reciprocate in a forward and rear direction as described hereafter.

It can thus be seen that handle bar 72 can be rotated around a generally vertical axis to steer bicycle 50 and can also rotate around a horizontal axis through bearing housing 70 in a rearward and forward direction relative to frame 52 of bicycle 50.

Handle bar 72 has a first strut 80 and a second, spaced strut 82 extending downwardly and forwardly of head tube 64, struts 80 and 82 being positioned on opposite sides of a front wheel 100.

Bicycle 50 has a subframe indicated generally as 90 comprised of the tines 92 and 94 of fork 66, struts 98 and 99 and bar 96, which generally form a triangular shaped, rigid framework for rotatably journaling both the front wheel 100 and the drive sprocket 110 for driving front wheel of the bicycle 50, as described hereafter. In this regard, there is a bearing housing 112 affixed to the subframe 90, housing 112 forming a horizontal bore there through.

Rotatable front wheel 100 having a center hub 102 and a shaft 104 journaled in the ends of tines 92 and 94. Fixedly connected to shaft 104 is a drive sprocket 106 which is connected by an endless chain 108 to a drive sprocket 110.

Drive sprocket 110 is rotatably journaled in through bearing 112 mounted on subframe 90 via shaft 114 extending through bearing 112.

The linkage system of the present invention comprises two linkages which interconnect drive shaft 114 connected in driving relationship to drive sprocket 110 and handle bar 72. One of the linkage systems, hereafter referred to the two arm linkage, comprises a first arm 116 and a second arm 118. First arm 116 is pivotally secured to the lower end of strut 80 and is also pivotally attached to second arm 118. Second arm 118 is fixedly connected to shaft 114 which in turn, as noted above, is in driving connection with drive sprocket 110. In certain cases, first arm 116 could be made of two rigidly connected sections, a first, longer section as shown and a second short section connected rigidly to the longer section, but at a slight angle which can vary from about 45-65° relative to the axis of the longer arm 116. This intermediate, short arm section would still be pivotally connected to second arm 118. The point is to dimension the first linkage such that the pivot point relative to the sprocket center line is at a desired location which will help, to some degree, move the first linkage over center. However, for simplicity's sake, arm 116 can be made, as shown, as a single, straight section and the relative length of arms 116 and 118 being adjusted so that the desired pivot point relative to the sprocket centerline between those two arms is achieved.

The other linkage, referred to hereafter as the three arm linkage, comprises a third arm 120, a fourth arm 122, and a fifth arm 124. Third arm 120 is pivotally connected to the lower end of strut 82, the other end being pivotally connected to fourth arm 122. Fourth arm 122 is in turn pivotally connected to fifth arm 124, which is fixedly, i.e., drivingly connected, to shaft 114, journaled in bearing 112. As will be seen hereafter, the two arm linkage does the majority, albeit not all, of the work in moving the sprocket from one over center position to the other over center position during the 360° rotation of the sprocket. The three arm linkage, while still driving the sprocket to some degree, serves the primary purpose of pushing or pulling the two arm linkage over center. Here again, the three arm linkage can have the relative length of the arms varied to achieve the desired pivot points relative to the sprocket centerline such that it performs its intended function.

It is well within the skill of the art with respect to both the two arm and the three arm linkage to adjust the relative lengths of the individual arms as well as, if desired, making certain of those arms with an angled portion, the goal being that all of the pivot points of the two arm and the three arm linkages are properly positioned relative to a center axis of the sprocket 110.

Referring now to FIGS. 8-11, the operation of the bicycle of the present invention is depicted schematically. Referring first to FIG. 8, it can be seen that the two arm linkage is slightly over center and the three arm linkage is slightly more over center. As the rider pushes handle bar 72 in the direction of arrow A, it pivots around an axis through bearing housing 70 and the struts 80 and 82 begin to move in the opposite direction of arrow A. This results in rotation of drive sprocket 110 and front wheel 100. As you continue to push handle bar 72 forward as shown in FIG. 9, the two arm linkage is doing most of the work rotating the sprocket 110. In this respect, the three arm linkage undergoes some lost or dwell motion. As the front wheel 100 moves to the position shown in FIG. 10, the two arm linkage is almost on center while the three arm linkage is on center. Accordingly, as you begin to pull the handle bars 72 in the direction of arrow B, the two arm linkage will now be on center and the three arm linkage will already be past center, such that if the rider continues pulling in the direction of arrow B, the three arm linkage will now pull the two arm linkage over center.

As noted, the two arm linkage does most of the work except when it is being pushed or pulled over center by the three arm linkage. As the handle bars 72 continue to be pulled in the direction of arrow B to their terminal point, the two arm linkage moves to just below center, while the three arm linkage is now over center and thereby pulls the two arm linkage over center. In all of these movements, the drive sprocket 110 is being rotated in the direction of arrow B which in turn rotates wheel 100 in the direction of arrow B. The simple linkage system of the present invention, comprising a two arm linkage and a three arm linkage, makes the bicycle of the present invention inexpensive to manufacture.

As shown in all the figures, preferably the struts 80 and 82 are at a slightly different angle as measured versus an imaginary axis passing through upper head tube 64. In particular, strut 80 is at a greater angle than strut 82. Although this is preferred, it is not necessary. For example, struts 80 and 82 could be at substantially the same angle relative to the imaginary axis passing through the head tube 64 such that slight changes in the relative lengths of the arms forming the linkages might be necessitated to accomplish the result of having the two arm linkage be the primary driving force for the drive sprocket 10, the three arm linkage being the primary driving force for moving the two arm linkage over center while still contributing to the overall driving action of the sprocket 10.

As can be seen from the above, the bicycle of the present invention provides an ideal, exercise device. In this regard, the bicycle can be powered with foot movement only driving the rear wheel or with arm movement only driving the front wheel. Alternatively, both the front and rear wheels can be driven simultaneously with both arm and foot movement. Further, although the front wheel is driven by reciprocal movement of the handle bars, it still can be steered in a conventional manner by turning of the handle bars to the left or right, as desired.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. In a bicycle having a main frame, a rear wheel driven by a foot operated crank assembly, a front wheel, a front fork having an upper and lower end, said front wheel being rotatably journaled in the lower end of said front fork, the upper end of said front fork being rotatable relative to said frame for steering said bicycle, said bicycle comprising:

a handle bar connected to the upper end of said front fork, said handle bar being rotatable along a generally horizontal axis whereby it is reciprocably movable in a forward and rear direction, said handle bar including first and second, downwardly extending struts having lower ends;

a drive sprocket rotatably journaled in a subframe connected to said main frame forward of said fork, said drive sprocket being connected by an endless chain to a driven sprocket connected to said front wheel;

a first linkage comprising first and second arms, said first arm being pivotally connected to a lower end of said first strut and pivotally connected to said second arm, said second arm being fixedly connected in driving relationship to said drive sprocket, said first arm being longer than said second arm;

a second linkage comprising third, fourth and fifth arms, said third arm being pivotally connected to said lower end of said second strut and pivotally connected to said fourth arm, said fourth arm being pivotally connected to said fifth arm, said fifth arm being fixedly connected in driving relationship to said drive sprocket, said third arm being longer than said first arm, said fifth arm being intermediate in length between said first arm and said second arm, and said fourth arm being shorter than either of said first, second, third or fifth arm; and said first linkage serving primarily to drive said sprocket between first and second substantially over center positions in response to reciprocal movement of said handle bar, said second linkage serving to move said first linkage over center in said first and second over center positions in response to reciprocal movement of said handle bar.

2. The bicycle of claim 1, wherein there is a neck extending from said upper end of said fork, said neck forming a bearing housing having a generally horizontal opening and said handle bar having a horizontal shaft, said horizontal shaft being journaled in said bearing housing.

3. The bicycle of claim 1, wherein said handle bar has first and second generally upwardly extending arms, each having a grip portion.

4. The bicycle of claim 1, wherein said drive subframe is generally triangular.

5. The bicycle of claim 1, wherein said subframe includes a bearing housing having a horizontal opening for receipt of a drive shaft, said second arm being fixedly connected to one end of said drive shaft, said fifth arm being fixedly connected to the other end of said drive shaft.

\* \* \* \* \*